Patented Mar. 17, 1953

2,632,000

UNITED STATES PATENT OFFICE 2,632,000

ANION EXCHANGE RESINS FROM AMINES AND ALKYL STYRENE POLYMERS

Elmer L. McMaster, Robert M. Wheaton, and James Russell Skidmore, Midland, Mich., assignors to The Dow Chemical Company, Midland, Mich., a corporation of Delaware No Drawing. Application December 29, 1948, Serial No. 68,063

10 Claims. (Cl. 260—88.1)

This invention concerns certain new anion exchange resins and a method of making the same. It pertains more particularly to the production of water-insoluble anion exchange resins from the benzene-insoluble copolymers of ar-alkyl-monovinyl-aromatic compounds with a polyvinyl-aromatic compound by halogenating the insoluble copolymers and reacting the halogenated polymeric vinyl-aromatic resins with ammonia or ammonia-type nitrogen-containing compounds, e. g. amines.

It is known to prepare anion exchange resins from polymers of divinylbenzene and copolymers of divinylbenzene with other polymerizable monovinyl-aromatic compounds, e. g. styrene, vinyl-naphthalene, ethylvinylbenzene, vinyltoluene, etc., by polymerizing divinylbenzene alone or in admixture with a polymerizable monovinyl-aromatic compound, using known procedure, and thereafter nitrating the insoluble polymeric product, in granular or finely divided form. The nitrated product is then reduced to the corresponding amino derivative by treatment with a reducing agent, e. g. nascent hydrogen. The polymeric products thus obtained contain amino groups directly attached to carbon atoms of the aromatic nuclei. Such products are anion exchange resins and are useful in water purification processes.

We have now found that basic anion exchange resins having good ion exchange capacity, containing a basic nitrogen atom, e. g. of an amine group attached to carbon atoms of the alkyl radicals in the polymeric product, can be prepared from the solid benzene-insoluble copolymers of ar-alkyl-monovinyl-aromatic compounds with a polyvinyl-aromatic compound by reacting the copolymer with chlorine or bromine and thereafter causing the halogenated polymeric vinyl-aromatic resin to react with ammonia or an ammonia-type nitrogen-containing compound.

The aminated products are solid resinous amines, or salts thereof, and certain of them, particularly those formed by reaction of tertiary amines with the halogenated copolymer derivatives, are more specifically resinous quaternary ammonium bases, or salts thereof. All of these products have an amine radical attached to an alkyl substituent on an aromatic nucleus of the polymer. The products are all insoluble in dilute aqueous acid and dilute aqueous alkali solutions, e. g. in hydrochloric acid or sodium hydroxide solutions of 10 weight per cent concentration. They are also substantially insoluble at room temperature in organic solvents such as acetone, ethanol, benzene, ethylene dichloride, tetrachloroethylene, chlorobenzene, or beta, beta'-dichlorodiethyl ether, etc.

The aminated products are all useful as anion exchange resins. However, they vary widely in ion exchange capacity and in selectivity toward the absorption of various anions. One such resin may preferentially absorb a certain anion from a solution containing a given mixture of anions, whereas another of the resins preferentially absorbs a different anion from such a solution. In general, the ion exchange capacity of the resin depends upon the proportion of basic nitrogen atoms, e. g. of an amine radical, introduced into the polymeric product. The number of such nitrogen atoms or amine radicals is, in turn, dependent upon the number of haloalkyl radicals in the halogenated resin starting material and upon the completeness with which the halogen atoms of the haloalkyl radicals are replaced by nitrogen atoms of ammonia or of an ammonia-type nitrogen-containing compound. The invention permits the production, from a single halomethylated copolymer, of a series of anion exchange resins having different ion exchange capacities and various degrees of selectivity for different anions.

The vinyl-aromatic resins subjected to halogenation by reaction with chlorine or bromine are preferably copolymers of divinylbenzene with ar-alkyl-monovinyl-aromatic compounds of the benzene or naphthalene series, i. e. having not more than 10 carbon atoms in the aromatic nucleus, which ar-alkyl-monovinyl-aromatic compounds have, in addition to the vinyl radical, from one to three lower alkyl radicals, other than a tertiary alkyl radical, containing from two to four carbon atoms, as nuclear substituents. Examples of such ar-alkyl-monovinyl-aromatic compounds are ar-ethyl-vinyl-benzene, ar-diethyl-vinyl-benzene, ar-sec.-butylstyrene, ar-ethyl-vinyl-naphthalene, ar-isopropylstyrene, ar-diethyl-vinyl-naphthalene, ar-triethyl-vinyl-benzene, etc. The copolymers are solid benzene-insoluble higher polymeric vinyl-aromatic resins, e. g. having molecular weights of 50,000 or above and they may contain 50 per cent by weight or less of a polyvinyl-aromatic compound such as divinyl-benzene, divinyl toluene, divinyl xylene, divinyl-naphthalene, divinyl-ethylbenzene, etc., chemically combined, i. e. interpolymerized, with the ar-alkyl-monovinyl-aromatic compounds just mentioned. The copolymers preferably contain from 0.5 to 40 per cent by weight of a polyvinyl-aromatic compound, e. g. divinylbenzene, and from 99.5 to 60 per cent of an ar-alkyl-monovinyl-aromatic compound. The copolymers may have inert fillers such as diatomaceous earth, finely shredded asbestos, or powdered glass, etc., incorporated therewith to increase the porosity and effective surface of the same.

The copolymers may be prepared by any suitable method heretofore employed for polymerization of vinyl type monomeric compounds. For instance, a mixture containing divinylbenzene and an ar-alkyl-monovinyl-aromatic compound, e. g. ar-ethyl-vinyl-benzene, may be polymerized in mass or in the presence of a dispersing medium for the monomers by the use of heat, light or heat and light in the presence or absence of a polymerization catalyst, at atmospheric, subatmospheric, or superatmospheric pressure.

Suitable catalysts for effecting polymerization of the monomers are the peroxides, e. g. benzoyl peroxide, lauroyl peroxide, hydrogen peroxide, acetylbenzoyl peroxide, etc. Per-compounds such as potassium persulfate, sodium perborate, ammonium persulfate or the like may also be employed as polymerization catalysts.

The polymerization is preferably carried out in aqueous dispersion at temperature between 80° and 100° C., employing a peroxide, e. g. benzoyl peroxide, as the polymerization catalyst, although other polymerization temperatures and catalysts may be employed. Usually a protective colloid such as sodium cellulose glycolate, methyl cellulose or the like is added to the aqueous dispersion so as to obtain the polymeric product in granular or bead form.

After polymerization is substantially complete the polymeric product is separated from the aqueous dispersion by usual methods, e. g. filtering, washed with water and dried by heating in a current of hot air or by other usual manner. The polymeric product may be broken, ground, crushed or otherwise reduced to a granular or powdered form or it may be used in the form of beads.

The halogenated derivatives of the copolymers may be prepared by reacting the vinyl-aromatic resins, at temperatures between −10° and 150° C., with chlorine or bromine in the presence of a catalyst promoting substitution of halogen for hydrogen attached to carbon atoms of the alkyl radicals on the aromatic nuclei such as phosphorus, phosphorus trichloride, ultraviolet light, or a combination of light and phosphorus trichloride, etc., while the copolymer, in granular form, is dispersed in and swollen by an organic liquid capable of swelling polystyrene such as carbon tetrachloride, benzene, monochlorobenzene, ortho-dichlorobenzene, acetic acid, tetrachloroethylene, etc., which organic liquid is less reactive with the chlorine or bromine than is the copolymer.

The halogenation reaction is preferably carried out at atmospheric pressure or a slightly higher pressure, e. g. 2 to 5 pounds per square inch gauge, at temperatures between 50° and 80° C., employing carbon tetrachloride as the dispersing medium. Halogenation is continued until one halogen atom is substituted for a hydrogen atom on a carbon atom alpha to the aromatic nucleus in at least a portion of the substituent alkyl radicals of the polymer and preferably until one halogen atom is substituted for a hydrogen atom in each of such alkyl radicals.

Such substituent halogen, i. e. halogen attached to a carbon atom in the alpha position to an aromatic nucleus of an alkyl radical, is relatively reactive with ammonia and ammonia-type nitrogen-containing compounds, e. g. primary, secondary and tertiary amines, as compared to nuclear substituted halogen or halogen substituted in the polymer chain and is herein referred to as reactive halogen.

The halogenation reaction to introduce a chlorine or bromine atom into an alkyl radical in the copolymer is usually accompanied, at least to some extent by substitution of halogen atoms on aromatic nuclei of the copolymer and also by substitution of halogen atoms in the polymer chain. Substitution of more than one halogen atom on a carbon atom, alpha to an aromatic nucleus, of an alkyl radical, or substitution of a halogen atom on a carbon atom of an alkyl radical other than a carbon alpha to an aromatic nucleus, forms halogenated polymeric derivatives which are not readily reactive with ammonia and amines to form a polymeric product having ion exchange capacity. Halogen attached to the polymer chain is likewise unreactive with amines. Chlorine or bromine substituted in the aromatic nucleus is also non-reactive with ammonia or amines, although, insofar as we are aware, such nuclear substitution of halogen has no adverse effect on the resin. On the contrary, some nuclear halogenation apparently, is an advantage by increasing the density of the granular resin, which causes more rapid settling of the resin granules on washing and regenerating beds of the same. The heavier resin granules are not as readily swept from a bed of the resin by upflow of liquid, when employed in the usual ion exchange processes.

The granular resin is usually reacted with from 0.5 to 2.0, preferably 0.5 to 1.0, molecular proportions of chlorine or bromine for each substituent alkyl radical in the aromatic nucleus of the structural unit, based on a molecular equivalent weight of the copolymer product. No exact proportions can be stated since the proportion of halogen reacted with the copolymer will vary depending upon the number of alkyl radicals attached to an aromatic nucleus in the copolymer, the proportion of halogen reacted with the alkyl radicals, and on other factors such as the amount of halogen introduced into the aromatic nucleus or introduced into the polymer chain. Halogenation is usually continued until the resin granules form a product having maximum ion exchange capacity when reacted with an amine. This can readily be determined by withdrawing a test portion of the halogenated resin granules from the reaction vessel during the halogenating reaction, washing the resin with water, heating the resin with an amine, e. g. dimethylamine, in aqueous solution at temperatures between 70° and 100° C. for 30 minutes and thereafter converting the aminated resin to the bicarbonate form by washing with an aqueous sodium bicarbonate solution, rinsing the resin free of bicarbonate solution with water, dispersing a known volume of the resin in an aqueous sodium chloride solution and titrating the solution with N/1 HCl solution to a pH of 4. Halogenation is stopped when such test shows that the resin forms a product having a satisfactory ion exchange capacity. For most copolymers the proportion of halogen to be employed will be within the limits indicated. Over-halogenation is to be avoided since halogen attached to a carbon atom of an alkyl radical, other than a carbon alpha to an aromatic nucleus, while non-reactive with ammonia or an amine to form a product having ion exchange capacity, apparently reacts in the presence of such basic compounds with loss of halogen without its replacement by ammonia-type nitrogen. Thus, in halogenating a copolymer containing more than two alkyl radicals attached to the same aromatic nucleus, the halogen is employed in the preferred range of proportions indicated so as to reduce substitution of halogen on a carbon atom of an alkyl radical other than a carbon atom alpha to an aromatic nucleus.

The halogenated resin is separated from the organic liquid, used as a dispersing agent, by usual methods such as filtering, centrifuging, decanting or the like and washed with water. The resin granules may be washed with a water-soluble organic solvent, e. g. acetone, methanol, ethanol, etc., to remove residual traces of the dispersing liquid and then washed with water. The halogenated resin granules may be dried by heating in a current of air at temperatures of about 50° C., or below but such drying is not necessary prior to reacting the halogenated resin with ammonia-type nitrogen-containing compounds.

The halogenated resin is mixed with ammonia or an ammonia-type nitrogen-containing compound and preferably heated to cause reaction between the ammonia-type nitrogen and a substituent reactive halogen atom attached to a carbon atom alpha to an aromatic nucleus, in an alkyl radical. Heating is continued until at least a portion, preferably each, of the reactive halogen atoms is replaced by an ammonia-type nitrogen atom, e. g. to form an amine halide.

The ammonia-type nitrogen-containing reactants should contain a basic tervalent nitrogen atom attached only to hydrogen or carbon. The tervalent nitrogen may have attached thereto all hydrogen atoms or a combination of hydrogen and carbon atoms as is the case when ammonia and methylamine are used, or the tervalent nitrogen may have only carbon attached thereto as when tertiary amines, e. g. trimethylamine, tributylamine, etc., are employed. The tervalent nitrogen may also be present in organic compounds containing two or more than two tervalent nitrogens in the same molecule, e. g. ethylenediamine, diethylenetriamine, etc. Examples of amines that may be used are methylamine, ethylamine, propylamine, butylamine, hexylamine, cyclohexylamine, aniline, diethylenetriamine, propylenediamine, dimethylamine, dibutylamine, dicyclohexylamine, hexylethylamine, methylethylamine, methylaniline, dimethylethanolamine, ethyldiethanolamine, butyldiisopropanolamine, ethylenediamine, benzylamine, cyclohexylamine, hexamethylenetetrazylamine, trimethylamine, triethylamine, diethylmethylamine, tributylamine, dimethylisopropanolamine, tripropylamine, triamylamine, amyldiethylamine, dibutylmethylamine, dimethylethylamine, ethylmethylpropylamine, butylmethylpropylamine, amylbutylethylamine, dimethylaniline, etc. Mixtures of two or more such ammonia-type nitrogen-containing compounds may also be employed.

The proportion of ammonia or ammonia-type nitrogen-containing compound to be employed relative to the halogenated polymeric reactant, should be such that there is present in the reaction mixture at least one tervalent nitrogen atom for each reactive halogen atom attached to a carbon atom alpha to an aromatic nucleus in the alkyl radical. The ammonia or amine may be used in excess over the minimum proportion just stated. Usually, from 1 to 3 molecular proportions of ammonia or amine are used per haloalkyl radical in the halogenated polymeric reactant employed, although greater amounts may be used.

The reaction between the halogenated resin granules and the ammonia-type nitrogen-containing compound may be carried out at atmospheric, subatmospheric or superatmospheric pressure and at temperatures of from 25° C. to 150° C., preferably from 25° to 100° C., in the presence or absence of a dispersing medium such as water, ethanol, acetone, etc. The reaction may be carried out employing a large excess of the ammonia-type nitrogen-containing compound, e. g. ammonia, trimethylamine, or methylamine, in which case no other dispersing medium need be used. When employing water-soluble amines that are not readily volatilized at the reaction temperature, the reaction is preferably carried out in an aqueous medium employing the amine in concentration of 20 to 50 per cent by weight or more, based on the combined weight of the same and the water, and the mixture is heated under reflux. The reaction is usually substantially complete in from 2 to 6 hours at reflux temperature.

The aminated resin is isolated, e. g. by filtering the reaction mixture, and washed with water. The aminated resin may be converted to its basic form by treatment with an aqueous alkali or alkali carbonate solution, e. g. sodium hydroxide, sodium bicarbonate, or potassium carbonate.

The following examples illustrate practice of the invention, but are not to be construed as limiting the scope thereof.

*Example 1*

Thirty-one parts by weight of a granular copolymer, containing in chemically combined form 96 parts by weight para-ethylstyrene and 4 parts divinylbenzene, was dispersed in 240 parts of carbon tetrachloride and 0.3 part of phosphorus trichloride added thereto as chlorination catalyst. The mixture was stirred in a glass vessel and heated to a temperature of 60° C. Chlorine was passed into the liquid for 2.75 hours at an average rate of 40 parts per hour, while exposing the reaction mixture to rays from an ultraviolet lamp placed to one side of the reaction vessel. The chlorinated resin was separated from the reaction mixture by filtering, washed with water and dried at room temperature. Analysis of a portion of the dry resin showed it to contain 41.20 per cent by weight side chain chlorine and 6.37 per cent nuclear chlorine. Five parts by volume of the chlorinated resin and 25 parts by volume of an aqueous 25 per cent by weight trimethylamine solution, were sealed in a pressure bottle and heated at a temperature of 70° C. for 16 hours. After cooling the bottle, the aminated resin was isolated by filtering the reaction mixture, washed with water and tested for ion exchange capacity. It had an anion exchange capacity equivalent to 20300 grains of calcium carbonate per cubic foot of resin bed.

*Example 2*

Three parts by volume of the granular chlorinated resin of Example 1 was placed in a pressure bottle, together with 10 parts by volume of n-butylamine and 10 parts of water. The bottle was sealed and the mixture heated at a temperature of 70° C. for 20 hours. After cooling the bottle, the aminated resin was isolated by filtering, washed with water and tested for ion exchange capacity. It had an anion exchange capacity equivalent to 12570 grains of calcium carbonate per cubic foot of resin bed.

Example 3

A granular copolymer, containing in chemically combined form 90 parts by weight sec.-butylstyrene, 6 parts ethylvinylbenzene and 4 parts divinylbenzene, was chlorinated by dispersing 30.5 parts by weight of the dry resin in 240 parts of carbon tetrachloride, adding 0.3 part of phosphorus trichloride as chlorination catalyst and passing chlorine into the mixture while heating the latter, in a glass vessel under exposure to ultraviolet light, at a temperature of 65° C. A total of 50 parts of chlorine was passed into the mixture over a period of two hours. The chlorinated resin was separated from the reaction mixture by filtering, washed with water and dried in a current of air at room temperature. Five parts by volume of the chlorinated resin and 25 parts by volume of an aqueous 25 per cent by weight trimethylamine solution, were sealed in a pressure bottle and heated at a temperature of 70° C. for 16 hours. The aminated resin was isolated by filtering, washed with water and tested for ion exchange capacity. It had an ion exchange capacity equivalent to 11,900 grains of calcium carbonate per cubic foot of resin bed.

Example 4

Three parts by volume of the granular chlorinated resin of Example 3, 10 parts by volume of diethylamine and 10 parts by volume of water, were sealed in a glass pressure bottle and heated at a temperature of 70° C. for 44 hours. After cooling the bottle, the resin was isolated by filtering, washed with water and tested for ion exchange capacity. It had an anion exchange capacity equivalent to 8920 grains of calcium carbonate per cubic foot of resin bed.

Example 5

Sixty-five parts by weight of a granular copolymer, containing in chemically combined form 53 parts by weight ethylvinylbenzene and 47 parts divinylbenzene, was dispersed in 319 parts of carbon tetrachloride and 0.7 part of phosphorus trichloride added thereto as chlorination catalyst. The mixture was stirred in a glass vessel and chlorine passed into the dispersion at a temperature of 60° C., while exposing the reaction mixture to rays from an ultraviolet lamp placed to one side of the vessel. A total of 65 parts of chlorine was fed into the mixture in 220 minutes. The chlorinated resin was separated from the liquid by filtering, washed with water and dried in a current of air at room temperature. Analysis of a portion of the dry resin showed it to contain 19.10 per cent by weight side chain chlorine and 4.90 per cent nuclear chlorine. Five parts by volume of the chlorinated resin granules and 25 parts by volume of an aqueous 25 per cent by weight trimethylamine solution, were sealed in a glass pressure bottle and heated at a temperature of 70° C. for 16 hours. After cooling the bottle, the aminated resin was isolated by filtering, washed with water and tested for ion exchange capacity. It had an anion exchange capacity equivalent to 6800 grains of calcium carbonate per cubic foot of resin bed.

Other modes of applying the principle of our invention may be employed instead of those explained, change being made as regards the method or products herein disclosed, provided the steps or products stated in any of the following claims or the equivalent of such stated steps or compounds be employed.

We therefore particularly point out and distinctly claim as our invention:

1. A method of making an anion exchange resin which comprises reacting, at temperatures between 25° and 100° C., a solid halogenated benzene-insoluble copolymer, containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 alkyl radicals each containing from two to four carbon atoms, other than a tertiary alkyl radical, as nuclear substituents, said halogenated copolymer having a reactive substituent halogen atom attached to a carbon atom alpha to an aromatic nucleus in each of at least a portion of the alkyl radicals, with a nitrogen-containing base selected from the group consisting of ammonia and amines in amount such that at least one trivalent nitrogen atom is present in the reaction mixture for each reactive halogen atom, attached to a carbon atom alpha to an aromatic nucleus, of an alkyl radical in the polymeric reactant.

2. A method of making an anion exchange resin which comprises reacting at temperatures between 25° and 100° C., a solid brominated benzene-insoluble copolymer, containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 alkyl radicals each containing from two to four carbon atoms, other than a tertiary alkyl radical, as nuclear substituents, said brominated copolymer having a reactive substituent bromine atom attached to a carbon atom alpha to an aromatic nucleus in each of at least a portion of the alkyl radicals, with a nitrogen-containing base selected from the group consisting of ammonia and amines in amount such that at least one trivalent nitrogen atom is present in the reaction mixture for each reactive bromine atom attached to a carbon atom, alpha to an aromatic nucleus, of an alkyl radical in the polymeric reactant.

3. A method of making an anion exchange resin which comprises reacting at temperatures between 25° and 100° C., a solid chlorinated benzene-insoluble copolymer, containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 alkyl radicals each containing from two to four carbon atoms, other than a tertiary alkyl radical, as nuclear substituents, said chlorinated copolymer having a reactive substituent chlorine atom attached to a carbon atom alpha to an aromatic nucleus in each of at least a portion of the alkyl radicals, with a nitrogen-containing base selected from the group consisting of ammonia and amines in amount such that at least one trivalent nitrogen atom is present in the reaction mixture for each reactive chlorine atom attached to a carbon atom alpha to an aromatic nucleus in the polymeric reactant.

4. A method of making an anion exchange resin which comprises reacting at temperatures between 25° and 100° C., a solid chlorinated benzene-insoluble copolymer of from 0.5 to 40 parts by weight divinylbenzene and from 99.5 to 60 parts ethylvinylbenzene, said chlorinated copolymer having a reactive substituent chlorine atom attached to a carbon atom alpha to the benzene nucleus in each of at least a portion of the ethyl radicals, with a nitrogen-containing base selected from the group consisting of ammonia and amines in amount such that at least one trivalent nitrogen atom is present in the reaction mixture for each reactive chlorine atom attached to a carbon atom alpha to the benzene nucleus in the polymeric reactant.

5. A method of making an anion exchange resin which comprises reacting at temperatures between 25° and 100° C., a solid chlorinated benzene-insoluble copolymer of from 0.5 to 40 parts by weight divinylbenzene and from 99.5 to 60 parts ethylvinylnaphthalene, said chlorinated copolymer having a reactive substituent chlorine atom attached to a carbon atom alpha to the naphthalene nucleus in each of at least a portion of the ethyl radicals, with a nitrogen-containing base selected from the group consisting of ammonia and amines in amount such that at least one trivalent nitrogen atom is present in the reaction mixture for each reactive chlorine attached to a carbon alpha to the naphthalene nucleus in the polymeric reactant.

6. The water-insoluble reaction product of a halogenated solid benzene-insoluble copolymer of from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 alkyl radicals containing from two to four carbon atoms, other than a tertiary alkyl radical, as nuclear substituents, which halogenated copolymer contains substantial nuclear halogenation and has a reactive substituent halogen atom attached to a carbon atom alpha to an aromatic nucleus in each of at least a portion of the alkyl radicals, with a nitrogen-containing base selected from the group consisting of ammonia and amines, in amount such that substantially each reactive halogen atom attached to a carbon atom alpha to an aromatic nucleus in an alkyl radical in the halogenated copolymer is replaced by a nitrogen atom.

7. The water-insoluble reaction product of a chlorinated solid benzene-insoluble copolymer of from 0.5 to 40 parts by weight of a polyvinyl-aromatic hydrocarbon and from 99.5 to 60 parts or an ar-alkyl monovinyl-aromatic hydrocarbon having the vinyl radical and from 1 to 3 alkyl radicals containing from two to four carbon atoms, other than a tertiary alkyl radical, as nuclear substituents, which chlorinated copolymer contains substantial nuclear chlorination and has a reactive substituent chlorine atom attached to a carbon atom alpha to an aromatic nucleus in each of at least a portion of the alkyl radicals, with a nitrogen-containing base selected from the group consisting of ammonia and amines, in amount such that substantially each reactive chlorine atom attached to a carbon atom alpha to an aromatic nucleus in an alkyl radical in the chlorinated copolymer is replaced by a nitrogen atom.

8. The reaction product of a chlorinated solid benzene-insoluble copolymer of from 0.5 to 40 parts by weight divinylbenzene and from 99.5 to 60 parts ethylvinylbenzene, which chlorinated copolymer contains substantial nuclear chlorination and has a reactive substituent chlorine atom attached to a carbon atom alpha to the benzene nucleus in each of at least a portion of the ethyl radicals, with a nitrogen-containing base selected from the group consisting of ammonia and amines, in amount such that substantially each reactive chlorine atom attached to a carbon alpha to a benzene nucleus in an ethyl radical in the chlorinated copolymer is replaced by a nitrogen atom.

9. The method of making an anion exchange resin as described in claim 1 wherein, the halogenated copolymer is prepared from a benzene-insoluble copolymer, containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 alkyl radicals each containing from two to four carbon atoms other than a tertiary alkyl radical, as nuclear substituents, by dispersing granules of the copolymer in an organic liquid capable of swelling polystyrene and reacting the copolymer at temperatures between −10° and 150° C. with a halogen selected from the group consisting of chlorine and bromine, in the presence of a catalyst promoting substitution of halogen in the alkyl radicals until the reaction product contains a reactive substituent halogen atom attached to a carbon atom alpha to an aromatic nucleus in each of at least a portion of the alkyl radicals in the copolymer.

10. The method of making an anion exchange resin as described in claim 1 wherein, the halogenated copolymer is prepared from a benzene-insoluble copolymer containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 alkyl radicals each containing from two to four carbon atoms, other than a tertiary alkyl radical, as nuclear substituents, by dispersing granules of the copolymer in an organic liquid capable of swelling polystyrene and reacting the copolymer at temperatures between −10° and 150° C. with chlorine in the presence of a catalyst promoting substitution of chlorine in the alkyl radicals until the reaction product contains a reactive substituent chlorine atom attached to a carbon atom alpha to an aromatic nucleus in each of at least a portion of the alkyl radicals in the copolymer.

ELMER L. McMASTER.
ROBERT M. WHEATON.
JAMES RUSSELL SKIDMORE.

REFERENCES CITED

The following references are of record in the file of this patent:

UNITED STATES PATENTS

| Number | Name | Date |
|---|---|---|
| 2,304,637 | Hardy | Dec. 8, 1942 |
| 2,366,008 | D'Alelio | Dec. 26, 1944 |
| 2,409,861 | Hunter | Oct. 22, 1946 |
| 2,591,574 | McBurney | Apr. 1, 1952 |